United States Patent [19]

Messina

[11] 4,209,075

[45] Jun. 24, 1980

[54] AUTOMOBILE SAFETY ASSEMBLY

[76] Inventor: Frank Messina, 533 Prospect, Kansas City, Mo. 64124

[21] Appl. No.: 955,637

[22] Filed: Oct. 30, 1978

[51] Int. Cl.$^2$ .............................................. B60R 21/10
[52] U.S. Cl. .................................. 180/268; 180/272; 188/110; 200/61.58 B; 307/105
[58] Field of Search ............... 180/268, 273, 272, 271; 280/808, 802, 807, 805, 801; 200/61.58 B, 61.58 R, DIG. 2; 307/105 B; 340/52 E; 188/110

[56] References Cited

U.S. PATENT DOCUMENTS

| | | | |
|---|---|---|---|
| 747,370 | 12/1903 | Brislin | 105/341 |
| 2,172,116 | 9/1939 | Warren | 188/110 |
| 2,711,528 | 6/1955 | Glossbrenner | 180/272 X |
| 2,738,496 | 3/1956 | Armstrong | 180/272 |
| 2,842,628 | 7/1958 | James | 200/61.58 R X |
| 3,013,624 | 12/1961 | De Remer et al. | 180/272 |
| 3,040,831 | 6/1962 | Farber | 188/110 X |
| 3,743,047 | 7/1973 | Dapolito | 188/110 |
| 3,938,613 | 2/1976 | Raborn | 180/272 |
| 3,980,988 | 9/1976 | Spizzo | 200/61.58 B |

FOREIGN PATENT DOCUMENTS

| | | | |
|---|---|---|---|
| 1258697 | 3/1961 | France | 280/806 |
| 7428 | of 1908 | United Kingdom | 180/271 |

*Primary Examiner*—John J. Love
*Assistant Examiner*—Milton L. Smith
*Attorney, Agent, or Firm*—Schmidt, Johnson, Hovey & Williams

[57] ABSTRACT

A shoulder strap for the driver of an automotive vehicle is used as a safety device for automatically braking the vehicle, de-energizing the ignition circuit and energizing a warning signal in the event the driver slumps in his seat because of sickness, injury, sleepiness, unconsciousness, or other incapacitating conditions rendering him incapable of properly operating the vehicle. Certain components of the vehicle are controlled whenever the slumping is sufficient to apply tension to the strap against the action of a spring connected with the strap. An extension of the strap beyond the operator's shoulder is readily accessible to passengers for actuation in the event they notice any tendency by the operator to become incapacitated, thereby preventing accidents and consequent injury or death to the occupants and others outside the vehicle.

10 Claims, 1 Drawing Figure

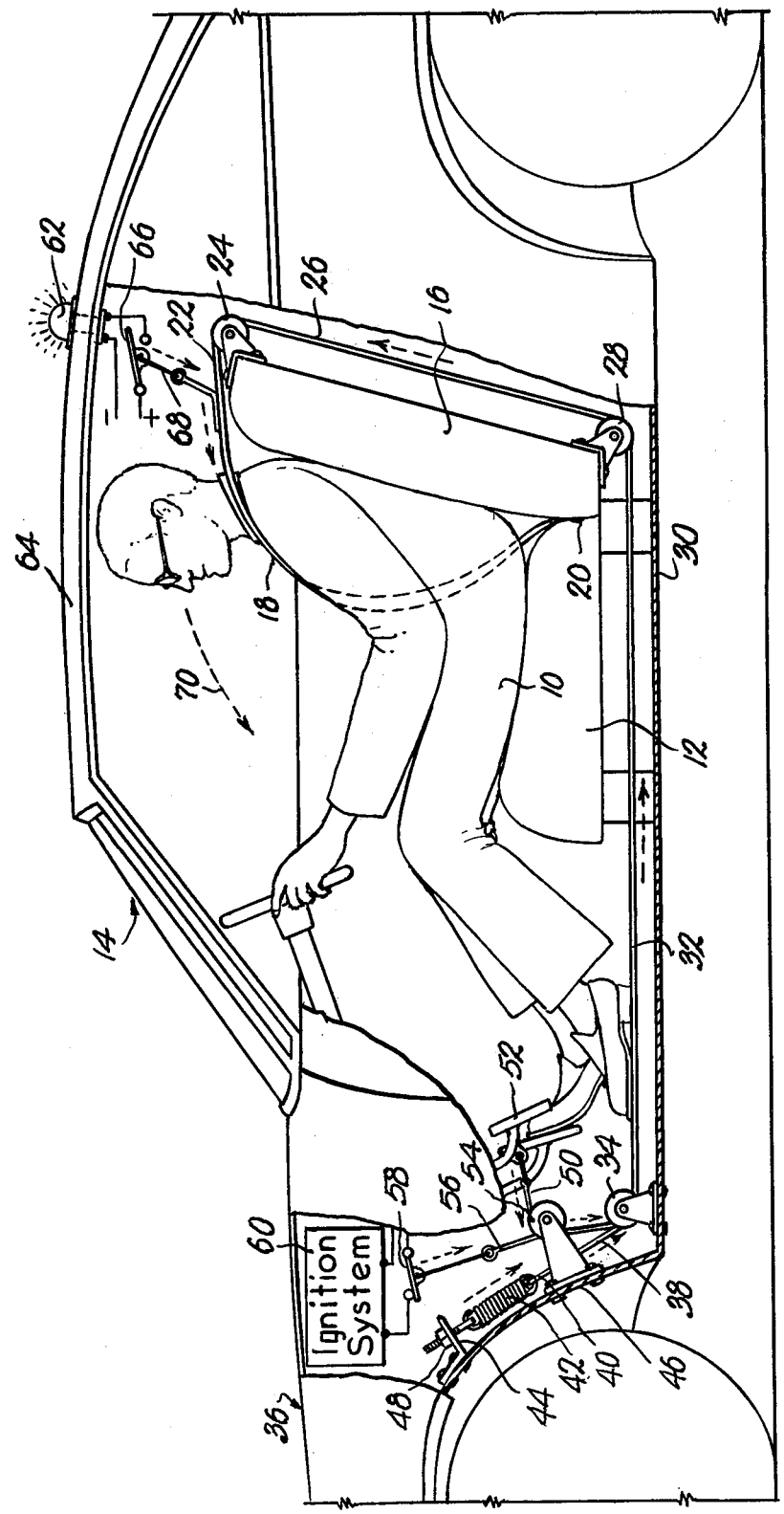

AUTOMOBILE SAFETY ASSEMBLY

The high rate of injury and death related to automotive vehicle accidents is caused, to a large extent, by driver incapacities. Oftentimes, even the slightest and momentary deficiencies on the part of the driver produce devastating results whether or not other vehicles are involved. Safety belts, shoulder straps or harnesses, and other devices have, of course, in some instances, tended to solve, in part at least, the death and injury problem—but only in a limited way; moreover, they have little effect in preventing the occurrence of the accident. And, I am aware of many suggestions as to how the advantages of my present invention might be attained, for example, the disclosures of the following U.S. Pat. Nos.:

747,370 A. J. Brislin Dec. 22, 1903
2,172,116 J. T. Warren Sept. 5, 1939
2,287,199 W. A. Schick June 23, 1942
2,296,003 Van Loo Sept. 15, 1942
2,873,811 W. B. Uffert, et al. Feb. 17, 1959
2,991,839 De Remer July 11, 1961
3,013,624 De Remer, Dec. 19, 1961
3,559,206 L. A. Beecham Jan. 26, 1971
3,825,092 Kenneth Graydon July 23, 1974
3,866,723 Elmer M. Smith Feb. 18, 1975
3,938,613 Eldridge W. Raborn Feb. 17, 1976
3,964,045 Cecil Conley June 15, 1976

However, even those disclosures among the above patents relating to devices which tend to restrain movement of the driver fail to recognize the need to utilize the shoulder strap. Attempts to employ merely the seat belt cannot be effective to any significant extent. Most movement on the part of the incapacitated driver will not even be sensed by a seat belt.

In accordance with the present invention, therefore, the shoulder strap is extended and spring-loaded such that my safety assembly is highly sensitive to potentially disastrous movements by the drive so as the effectively deactivate the vehicle under virtually all conditions of driver difficulty. Moreover, the strap extension is disposed for grasp by other occupants, presenting an additional safety feature not heretofore contemplated by others working in this field.

In the drawing, there is illustrated an automotive vehicle broken away and in section to show, essentially in elevation, but in part somewhat schematic, the safety assembly embodying my present invention.

The normal position of the driver 10 on seat 12 of an automotive vehicle 14 is essentially erect against back rest 16, particularly when restrained by a shoulder strap 18. The strap 18 is secured at one of its ends 20 adjacent the driver 10, passes upwardly and laterally, obliquely across the chest of the driver 10 and then over one of his shoulders to an extension 22 over the top of the back rest 16.

The strap 18 continues from the extension 22 over a roller 24 and then downwardly in a stretch 26 to the rear of the back rest 16 for passage over another roller 28.

The strap 18 then continues from the roller 28 forwardly of the vehicle 14 along the floorboard 30 in an extension 32, which passes under a third roller 34 within or adjacent the engine compartment 36 of the vehicle 14. A final stretch 38 of the strap 18 extends from the roller 34 upwardly and forwardly with that end 40 of the strap 18 opposite the end 20 connected directly to a coil spring 42 capable of maintaining the strap 18 and all of its components 22, 26, 32 and 38 taut when the strap 18 is in restraining relationship to the driver 10 as illustrated.

The spring 42 is, in turn, connected to the vehicle 14 such as through use of a bracket 44 attached to fender 46. Takeup means 48 connecting the spring 42 to the bracket 44 may be employed for adjusting the tension of the spring 42.

The entire strap 18 from end 20 to end 40 should be made from a suitable, stout, flexible material incapable of any appreciable extension when tension is placed thereon.

A flexible connection 50 between the stretch 38 and the brake pedal 52 of the vehicle 14 passes over a roller 54. The connection 50 has a branch 56 which couples to a cut-out switch 58 within the ignition circuit 60 of the vehicle 14.

A warning signal such as a flasher lamp 62 is mounted on the roof 64 of the vehicle 14 or at any other suitable location where it can be readily viewed from various points exteriorly of the vehicle 14. The lamp 62 has a normally open switch 66 in its electric circuit coupled to the extension 22 by a connection 68.

Operation

The strap 18 is sensitive to any slumping on the part of the driver 10, either forwardly as illustrated by the arrow 70 or laterally, however slight such movement on the part of the operator 10 may be, resulting in tension applied to the strap 18 against the action of the spring 42. That is to say, the spring 42 yieldably biases the strap 18 across the chest and over the shoulder of the operator 10. Such pull on the strap 18 operates to effect the following controls simultaneously:

the brake pedal 52 is depressed such as to bring the vehicle 14 to a halt, the ignition system 60 is de-energized by virtue of opening of the switch 58 such as to render the engine of the vehicle 14 inoperable and the signal 62 commences its flashing action by virtue of energization of its electric circuit through closing of its switch 66.

Equally important is the accessibility of the stretch 26 to occupants of the rear seat (not shown) of the vehicle 14. In the event it becomes apparent that the driver 10 is having difficulty which is likely to cause him to lose control of the vehicle 14, it is but necessary to grasp and exert a pull on the stretch 26, causing the same safety control in the ignition system 60, the brakes of the vehicle 14 and the warning device 62. Anti-friction means other than the rollers 24, 28, 34 and 54 may be used provided that there is no impediment to the tension applied to the strap 18 in emergency situations.

I claim:

1. A safety system for an automotive vehicle having control means, said system comprising:
    a flexible shoulder strap having one end thereof fastened to the vehicle adjacent the driver;
    a spring interconnecting the vehicle and the opposite end of the strap remote from the driver;
    said strap extending obliquely across the chest of the driver, thence over one of his shoulders, then downwardly along the back of the driver's seat and then under said seat toward the spring whereby tension will be applied to the strap against the action of the spring in the event the driver slumps in said seat; and means operably coupling the strap with said control means for deactivating the vehicle when said tension is applied to the strap.

2. The invention of claim 1, said control including a brake pedal, said coupling means including a connection between the strap and the pedal for depressing the latter.

3. The invention of claim 2, said control including an ignition circuit, said coupling means including a cut-out switch in said circuit and a connection between the strap and the switch for opening the latter to de-energize the circuit.

4. The invention of claim 3; and a warning signal on the vehicle operably coupled with the strap.

5. The invention of claim 2; and a warning signal on the vehicle operably coupled with the strap.

6. The invention of claim 1, said control including an ignition circuit, said coupling means including a cut-out switch in said circuit and a connection between the strap and the switch for opening the latter to de-energize the circuit.

7. The invention of claim 6; and a warning signal on the vehicle operably coupled with the strap.

8. The invention of claim 1; and a warning signal on the vehicle operably coupled with the strap.

9. The invention of claim 8, said signal comprising a flasher lamp on the roof of the vehicle provided with an electric circuit having a control switch, said strap having a connection with the control switch for closing the latter to energize the electric circuit.

10. The invention of claim 1, the spring being adjacent the engine of the vehicle; and a number of anti-friction guide means for the strap spaced along the distance spanned by the strap between the spring and said shoulder of the operator.

* * * * *